US007742781B2

(12) United States Patent
Chen et al.

(10) Patent No.: US 7,742,781 B2
(45) Date of Patent: Jun. 22, 2010

(54) POWER CONTROL FOR POINT-TO-MULTIPOINT SERVICES PROVIDED IN COMMUNICATION SYSTEMS

(75) Inventors: Tao Chen, San Diego, CA (US); Jun Wang, San Diego, CA (US); Edward G. Tiedemann, Jr., Concord, MA (US)

(73) Assignee: Qualcomm Incorporated, San Diego, CA (US)

( * ) Notice: Subject to any disclaimer, the term of this patent is extended or adjusted under 35 U.S.C. 154(b) by 1385 days.

(21) Appl. No.: 10/113,257

(22) Filed: Mar. 28, 2002

(65) Prior Publication Data
US 2003/0134655 A1     Jul. 17, 2003

Related U.S. Application Data

(60) Provisional application No. 60/279,970, filed on Mar. 28, 2001.

(51) Int. Cl.
*H04B 7/00* (2006.01)
(52) U.S. Cl. .............................. 455/522; 455/518
(58) Field of Classification Search .................. 370/311; 455/69, 522, 436, 439, 442, 33.1, 33.2, 450, 455/455, 464, 509, 511, 515, 516
See application file for complete search history.

(56) References Cited

U.S. PATENT DOCUMENTS

| | | |
|---|---|---|
| 4,901,307 A | 2/1990 | Gilhousen et al. |
| 5,056,109 A | 10/1991 | Gilhousen et al. |
| 5,103,459 A | 4/1992 | Gilhousen et al. |
| 5,235,631 A | 8/1993 | Grube et al. |
| 5,365,572 A | 11/1994 | Saegusa et al. |
| 5,504,773 A | 4/1996 | Padovani et al. |
| 5,881,368 A | 3/1999 | Grob et al. |

(Continued)

FOREIGN PATENT DOCUMENTS

EP     0993128     4/2000

(Continued)

OTHER PUBLICATIONS

International Search Report—PCT/US02/009825; International Search Authority—European Patent Office, Oct. 28, 2002.

(Continued)

*Primary Examiner*—Tu X Nguyen
(74) *Attorney, Agent, or Firm*—Pavel Kalousek; John J. Ketchum (57) ABSTRACT

To enable point-to-multipoint communication services in an existing cellular communication system infrastructure, each member subscriber station, i.e., a subscriber station participating in such a service, is receiving a forward link shared channel, and in certain embodiments additionally a forward link dedicated channel. Because transmission on the forward link channels from neighboring sectors presents interference to the transmission from the sector serving the subscriber station, it is desirable to control the forward link channel transmission power to the minimum acceptable power. Additionally, a transmission form each member subscriber station on a reverse link channel presents interference to other subscriber stations. Therefore, it is desirable to control the reverse link channel transmission to the minimum signal level. Consequently, a method and apparatus for a power control that enables point-to-multipoint services in an existing infrastructure of a wireless cellular telephone system is disclosed.

16 Claims, 2 Drawing Sheets

U.S. PATENT DOCUMENTS

| | | | |
|---|---|---|---|
| 5,884,196 A * | 3/1999 | Lekven et al. | 455/574 |
| 5,970,417 A | 10/1999 | Toyryla et al. | |
| 5,983,099 A * | 11/1999 | Yao et al. | 455/426.1 |
| 6,006,073 A | 12/1999 | Glauner et al. | 455/67.1 |
| 6,058,289 A | 5/2000 | Gardner et al. | |
| 6,385,461 B1 | 5/2002 | Raith | |
| 6,473,419 B1 | 10/2002 | Gray et al. | |
| 6,529,740 B1 | 3/2003 | Ganucheau, Jr. et al. | |
| 6,539,242 B1 | 3/2003 | Bayley | |
| 6,577,848 B1 | 6/2003 | Gregg et al. | |
| 6,728,226 B1 * | 4/2004 | Naito | 370/328 |
| 6,731,936 B2 | 5/2004 | Chen et al. | |
| 6,804,520 B1 * | 10/2004 | Johansson et al. | 455/450 |
| 6,831,910 B1 * | 12/2004 | Moon et al. | 370/342 |
| 6,920,119 B2 | 7/2005 | Rinchiuso | |
| 6,978,143 B1 | 12/2005 | Vialen | |
| 6,983,410 B2 | 1/2006 | Chen | |
| 6,987,982 B2 | 1/2006 | Willenegger et al. | |
| 2001/0036200 A1 | 11/2001 | Nelson et al. | |
| 2002/0089950 A1 * | 7/2002 | Sourour et al. | 370/335 |
| 2002/0181423 A1 | 12/2002 | Chen et al. | |

FOREIGN PATENT DOCUMENTS

| | | |
|---|---|---|
| EP | 099656 | 5/2000 |
| EP | 1143635 | 10/2001 |
| WO | 9810604 | 3/1998 |
| WO | 9825422 | 6/1998 |
| WO | 9922466 | 5/1999 |
| WO | 9966657 | 12/1999 |
| WO | 0074311 | 12/2000 |
| WO | 0120805 | 3/2001 |

OTHER PUBLICATIONS

International Preliminary Examination Report—PCT/US02/009825, IPEA/US—Alexandria, Virgnia, Mar. 22, 2005.

European Search Report—EP02757871, The Hague—Feb. 19, 2007.

\* cited by examiner

FIG. 1

POWER CONTROL FOR POINT-TO-MULTIPOINT SERVICES PROVIDED IN COMMUNICATION SYSTEMS

CROSS REFERENCE

This application claims priority from co-pending Provisional Application No. 60/279,970, filed Mar. 28, 2001, entitled "METHOD AND APPARATUS FOR GROUP CALLS USING DEDICATED AND COMMON CHANNELS IN WIRELESS NETWORKS."

BACKGROUND

1. Field

The present invention relates to point-to-multipoint services, in a wireline or a wireless communication system. More specifically, the present invention relates to a method and an apparatus for a power control in such a point-to-multipoint services communications system.

2. Background

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber terminals requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. Likewise, the communication can be conducted between a first user on a mobile subscriber station and a second user on a landline station. A base station receives the data from the user on a reverse link, and routes the data through a public switched telephone network (PSTN) to the second user.

In a wireless communication system, maximizing a capacity of the communication system in terms of the number of simultaneous telephone calls that can be handled is extremely important. The capacity in a spread spectrum communication system can be maximized if the transmission power of each subscriber station is controlled such that each transmitted signal arrives at a base station receiver at the same signal level. However, if a signal transmitted by a subscriber station arrives at the base station receiver at a power level that is too low, quality communications cannot be achieved due to interference from the other subscriber stations. On the other hand, if the subscriber station transmitted signal is at a power level that is too high when received at the base station, communication with this particular subscriber station is acceptable but this high power signal acts as interference to other subscriber stations. This interference may adversely affect communications with other subscriber stations. Therefore, each subscriber station needs to transmit the minimum signal level expressed as e.g., a signal-to-noise ratio, that allows transmitted data recovery.

Consequently, the transmission power of each subscriber station within the coverage area of a base station is controlled by the base station to produce the same nominal received signal power at the base station. In an ideal case, the total signal power received at the base station is equal to the nominal power received from each subscriber station multiplied by the number of subscriber stations transmitting within the coverage area of the base station plus the power received at the base station from subscriber stations in the coverage area of neighboring base stations.

The received power is determined by an attenuation of the transmitted power by a path loss of the link. The path loss can be characterized by two separate phenomena: average path loss and fading. In many communication systems, e.g., IS-95, W-CDMA, IS-2000, the forward link and the reverse link are allocated separate frequencies, i.e., the forward link operates on a different frequency than the reverse link. However, because the forward link and reverse link frequencies are within the same general frequency band, a significant correlation between the average path losses of the two links exists. On the other hand, fading is an independent phenomenon for the forward link and reverse link and varies as a function of time.

In an exemplary CDMA system, each subscriber station estimates the path loss of the forward link based on the total power at the input to the subscriber station. The total power is the sum of the power from all base stations operating on the same frequency assignment as perceived by the subscriber station. From the estimate of the average forward link path loss, the subscriber station sets the transmit level of the reverse link signal. Should the reverse link channel for one subscriber station suddenly improve compared to the forward link channel for the same subscriber station due to independent fading of the two channels, the signal as received at the base station from this subscriber station would increase in power. This increase in power causes additional interference to all signals sharing the same frequency assignment. Thus a rapid response of the subscriber station transmit power to the sudden improvement in the channel would improve system performance. Therefore, it is necessary to have the base station continually contribute to the power control mechanism of the subscriber station.

Thus, the subscriber station's transmit power is controlled by one or more base stations. Each base station, with which the subscriber station is in communication, measures the received signal strength from the subscriber station. The measured signal strength is compared to a desired signal strength level for that particular subscriber station. A power adjustment command is generated by each base station and sent to the subscriber station on the forward link. In response to the base station power adjustment command, the subscriber station increases or decreases the subscriber station transmit power by a predetermined amount. By this method, a rapid response to a change in the channel is effected and the average system performance is improved. Note that in a typical cellular system, the base stations are not intimately connected and each base station in the system is unaware of the power level at which the other base stations receive the subscriber station's signal.

When a subscriber station is in communication with more than one base station, power adjustment commands are provided from each base station. The subscriber station acts upon these multiple base station power adjustment commands to avoid transmit power levels that may adversely interfere with other subscriber station communications, and yet provide sufficient power to support communication from the subscriber station to at least one of the base stations. This power control mechanism is accomplished by having the subscriber station increase its transmit signal level only if every base station, with which the subscriber station is in communication, requests an increase in power level. The subscriber station decreases the subscriber station's transmit signal level if any base station, with which the subscriber station is in communication, requests that the power be decreased. A system for base station and subscriber station power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, assigned to the assignee of the present invention.

In addition to the above-described reverse link power control, it is also desirable to control the relative power used in each traffic channel transmitted on a forward link by the base station. To enable such a control, each remote station measures the power of traffic channels received form a base station, generates control information in response, and transmits the control information back to the base station. The primary reason for providing such control is to accommodate the fact that in certain locations the forward link may be unusually disadvantaged. Unless the power being transmitted to the disadvantaged subscriber station is increased, the signal quality may become unacceptable. An example of such a location is a point where the path loss to one or two neighboring base stations is nearly the same as the path loss to the active base station, i.e., a base station communicating with the subscriber station. In such a location, the total interference would be increased three times over the interference seen by a subscriber station at a point relatively close to the active base station. In addition, the interference coming from the neighboring base stations does not fade in unison with the signal from the active base station as would be the case for interference coming from the active base station. A subscriber station in such a situation may require 3 to 4 dB additional signal power from the active base station to achieve adequate performance. At other times, the subscriber station may be located where the signal-to-interference ratio is unusually good. In such a case, the base station could transmit the desired signal using a lower than normal transmitter power, reducing interference to other signals being transmitted by the system.

The above described wireless communication service is an example of a point-to-point communication service. In contrast, a point-to-multipoint service is a service where the information transmitted by a source of the information is intended for a plurality of mobile stations. The basic model of a point-to-multipoint system comprises a set of users, a group of which is served by one or more sources of information, which provide information with a certain contents, e.g., news, movies, sports events and the like, to be transmitted to the users. Each user's subscriber station participation in the point-to-multipoint service (a member subscriber station) monitors a forward link shared channel. Because the source of information fixedly determines the content, the users are generally not communicating back. Examples of common usage of such a point-to-multipoint services communication systems are TV broadcast, radio broadcast, and the like. Alternatively, the source of information is a user—a member of the group, which transmits information intended for the remaining members of the selected group. If the user wishes to talk, he presses a push to talk (PTT) button. Typically, the talking user's voice is routed from the subscriber station to a transceiver station on a dedicated reverse link. The transceiver station then transmits the talking user's voice over the forward link shared channel. As in case of the point-to-point communication system, such a communication system allows both landline and wireless subscriber station to access the system. Such a point-to-multipoint service is also referred to as a group service. Examples of the group service communication system use is in dispatch services, such as local police radio systems, taxicab dispatch systems, Federal Bureau of Intelligence and secret service operations, and general military communication systems.

The above-mentioned point-to-multipoint service communication systems are generally highly specialized purpose-build communication systems. With the recent, advancements in wireless cellular telephone systems there has been an interest of utilizing the existing infrastructure of the—mainly point-to-point cellular telephone systems—for point-to-multipoint services. As used herein, the term "cellular" system encompasses system operating on both cellular and personal communication system (PCS) frequencies.

The power control mechanism for subscriber stations acting as point-to-point units described above is not directly applicable to point-to-multipoint services. As discussed, the wireless cellular telephone systems assign a dedicated forward and reverse link between two or more communicating users. In contrast, the point-to-multipoint services typically rely on assigning a shared forward link to be monitored by all the users in the group. Furthermore, in a point-to-multipoint services, in general, majority of the subscriber stations are passive (i.e. just listening) at any one time. When a subscriber station is passive, it does not necessarily have an established reverse link on which to transmit information to the base station. Because the power control method in the existing infrastructure is based on a point-to-point communications model, there is a need in the art for a method and apparatus for a power control that enables group services in an existing infrastructure of a wireless cellular telephone system.

SUMMARY

In one aspect of the invention, the above stated needs are addressed by controlling a reverse link channel power by determining sectors whose coverage area contain active subscriber stations belonging to a group; and transmitting reverse link power control commands on a forward link common channel from the determined sectors. The forward link common channel is received at each subscriber station belonging to a group; and the reverse link transmission power is adjusted at the active subscriber stations belonging to a group in accordance with the reverse link power control commands contained in the forward link common channel.

In another aspect of the invention, the above stated needs are addressed by controlling a reverse link channel power in a point-to-multipoint communication system by transmitting user data on a forward link common channel; and transmitting reverse link power control commands on a forward link dedicated channel. The above stated needs are further addressed by receiving at each subscriber station belonging to a group a forward link common channel; receiving at each subscriber station belonging to a group a forward link dedicated channel; and adjusting at the active subscriber stations belonging to a group reverse link transmission power in accordance with reverse link power control commands contained in the forward link dedicated channel.

In yet another aspect of the invention, the above stated needs are addressed by controlling a reverse link channel power in a point-to-multipoint communication system by determining at the access network sectors whose coverage area contain active subscriber stations belonging to a group; and transmitting reverse link power control commands on a forward link dedicated channel from the determined sectors. The above stated needs are further addressed by receiving at each subscriber station belonging to a group a forward link common channel; receiving at each active subscriber station belonging to a group a forward link dedicated channel; and adjusting at the active subscriber stations belonging to a group reverse link transmission power in accordance with reverse link power control commands contained in the forward link dedicated channel.

In one aspect of the invention, the above stated needs are addressed by controlling a forward link channel power in a point-to-multipoint communication system by monitoring at a sector at least one reverse link channel to detect a quality metric of a forward link shared channel; and adjusting the forward link shared channel power in accordance with the worst quality metric.

In another aspect of the invention, the above stated needs are addressed by controlling a forward link channel power in a point-to-multipoint communication system by determining at each subscriber station belonging to a group a quality metric of a forward link shared channel; and transmitting the determined quality metric.

DETAILED DESCRIPTION

Definitions

The word "exemplary" is used herein to mean "serving as an example, instance, or illustration." Any embodiment described herein as "exemplary" is not necessarily to be construed as preferred or advantageous over other embodiments.

The terms point-to-point communication is used herein to mean a communication between two subscriber stations over a dedicated forward communication channel and dedicated reverse communication channel.

The term point-to-multipoint communication service is used herein to mean a communication wherein a plurality of subscriber stations are receiving communication from—typically—one source. Such services may comprise, e.g., group service, in which the source is a subscriber station; a broadcast service, in which the source is a central station; or a multicast service, in which the recipients comprise a sub-set of the plurality of subscriber stations.

The term access network is used herein to mean a collection of base stations (BS) and one or more base stations' controllers. The access network transports data packets between multiple subscriber stations. The access network may be further connected to additional networks outside the access network, such as a corporate intranet or the Internet, and may transport data packets between each access terminal and such outside networks.

The term base station is used herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station is used herein to mean the hardware with which an access network communicates. A subscriber station may be mobile or stationary. A subscriber station may be any data device that communicates through a wireless channel or through a wired channel, for example using fiber optic or coaxial cables. A subscriber station may further be any of a number of types of devices including but not limited to PC card, compact flash, external or internal modem, or wireless or wireline phone. A subscriber station that is in the process of establishing an active traffic channel connection with a BS is said to be in a connection setup state. A subscriber station that has established an active traffic channel connection with a BS is called an active subscriber station, and is said to be in a traffic state.

The term forward channel/link is used herein to mean a communication channel/link through which a base station sends signals to an subscriber station.

The term reverse channel/link is used herein to mean a communication channel/link through which the subscriber station sends signals to the base station.

The term physical channel is used herein to mean a communication route over which a signal propagates described in terms of modulation characteristics and coding.

The term logical channel is used herein to mean a communication route within the protocol layers of either the base station or the subscriber station.

The term communication channel is used herein to mean a physical channel or a logical channel in accordance with the context.

The term soft hand-off is used herein to mean a communication between a subscriber station and two or more sectors, wherein each sector belongs to a different cell. The reverse link communication is received by both sectors, and the forward link communication is simultaneously carried on the two or more sectors' forward links.

The term softer hand-off is used herein to mean a communication between a subscriber station and two or more sectors, wherein each sector belongs to the same cell. The reverse link communication is received by both sectors, and the forward link communication is simultaneously carried on one of the two or more sectors' forward links.

The term puncture is used herein to mean replacing a first information content of a first size with a second information content of a first size.

The term dedicated channel is used herein to mean a channel modulated by information specific to an individual subscriber station.

The term common channel is used herein to mean a channel modulated by information shared among all subscriber stations.

The term user data or payload is used herein to mean data other than control data.

The term control data is used herein to mean data enabling operation of entities in a communication system.

Description

Figure 1:
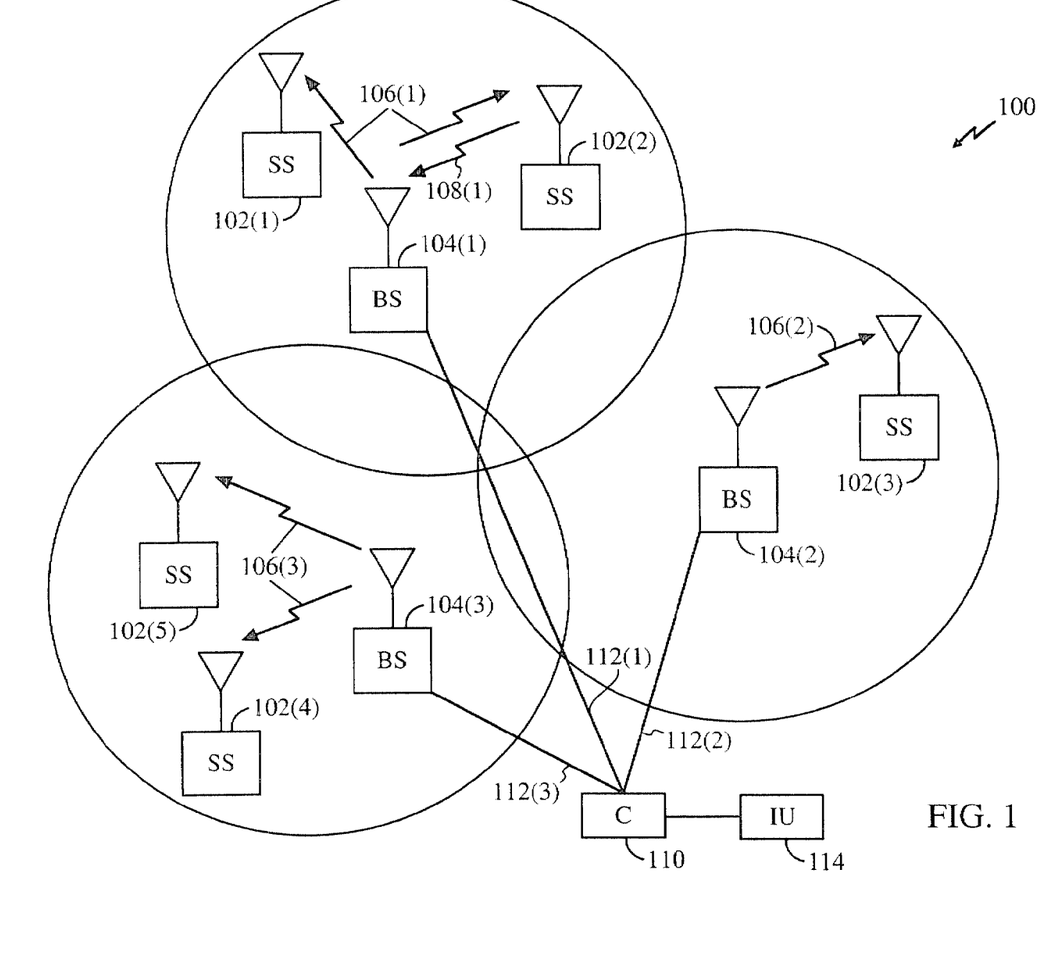
FIG. 1 illustrates a conceptual diagram of a group services communication system.

FIG. 1 illustrates a conceptual diagram of a communication system 100 capable of providing point-to-multipoint services in accordance with embodiments of the present invention. For tutorial purposes, the following description illustrates a group call; however, one of ordinary skills in the art understands how to apply the disclosed concepts to other point-to-multipoint services. A (calling) group is defined by the group's membership, comprising users of subscriber stations talking to one another frequently enough to establish the calling group. The calling group is said to be in a sleep state when no member is either idle or active, e.g., all members are either powered off or do not participate in the calling group. The calling group is in the idle state when at least one member participates in the group. The calling group is in the active state when one of at least two members initiates a group call. A group call is divided into active and silent periods. The group call is in the active period when there are transmissions between the members without long idle periods. The group call is in a silent period when there is no member transmitting any traffic for a period extending the long idle period.

In an active period, a group user on a member subscriber station, e.g., member subscriber station 102(1) communicates user information (voice or data) to other group users on member subscriber stations 102(2) through 102(5) via an access network comprising base stations 104 and a controller 110. For brevity, the term "member subscriber station" is used hereinafter to mean "user on a subscriber station" unless stated otherwise. Although the term base station is used, one of ordinary skills in the art recognizes that the embodiments are equally applicable to sectors. The base stations 104 are connected to the controller 110 by backhauls 112. The term backhaul is used to mean a communication link between a controller and a base station. The backhaul 112 can be implemented in a number of connection types including, e.g., a microwave or wire-line E1 or T1, optical fiber, and other connection types known to one of ordinary skills in the art. The controller 110 is connected to an interface unit 114, interfacing the communication system 100 with other services (not shown), e.g., a public switched telephone network (PSTN), packed data serving node (PDSN), and other services known to one of ordinary skills in the art.

When a member subscriber station, e.g., the subscriber station 102(1), desires to transmit user data to the group aver the reverse link, the member subscriber station needs to request a reverse link assignment and request to transmit. In one embodiment, the subscriber station 102(1), sends an access channel message requesting a reverse link to base station, e.g., base station 104(1). The access message is sent on an access channel. The access channel is a reverse link channel used by subscriber stations for communicating to the base station. The access channel is used for short signaling message exchanges such as call originations, responses to pages, and registration. An access attempt is sent by the subscriber station in a series of access probes. Each access probe carries the same information but is transmitted at a higher power level than the previous one. The access probes continue until a base station acknowledgment is received at the subscriber station. However, one skilled in the art recognizes that other access arrangements as described in a provisional application Ser. No. 60/279,970, entitled "METHOD AND APPARATUS FOR GROUP CALLS USING DEDICATED AND COMMON CHANNELS IN WIRELESS NETWORKS," filed Mar. 28, 2001, assigned to the assignee of the present invention are equally applicable.

Once the communicating (active) member subscriber station 102(1) is assigned a reverse link channel 108(1), the subscriber station 102(1) may transmit information to a base station 104(1). The reverse link assignment are detailed in the above-mentioned a provisional application Ser. No. 60/279, 970, entitled "METHOD AND APPARATUS FOR GROUP CALLS USING DEDICATED AND COMMON CHANNELS IN WIRELESS NETWORKS," filed Mar. 28, 2001, assigned to the assignee of the present invention are equally applicable. The base station 104(1) routes the received information to base stations 104(2) and 104(3), and transmits the received information on a forward link shared channel 106(1) to the user 102(2). The base stations 104(2) and 104(3) transmit the routed information on the forward link shared channels 106(2) and 106(3). To receive the information from the active member subscriber station 102(1), all the member subscriber stations of an active group, i.e., the subscriber stations 102(1) through 102(5) are assigned to monitor the forward link shared channel(s) 106 of their individual base stations 104 during active group calls. In general, the forward link shared channels 106(1), 106(2), and 106(3) assigned by the respective base stations or 104(1), 104(2), and 104(3) are different from one another. However, to allow improved reception of member subscriber stations 102 located in overlapping coverage areas, the forward link shared channel 106 may be transmitted synchronously by more than one sector or base station 104. The method for improved reception of the forward link common shared channel in overlapping coverage areas is disclosed in co-pending application Ser. No. 09/933,607, entitled "METHOD AND SYSTEM FOR A HANDOFF IN A BROADCAST COMMUNICATION SYSTEM," filed Aug. 20, 2001, assigned to the assignee of the present invention.

In one embodiment, the forward link shared channel 106 is modulated by the user information intended to the group member subscriber stations, and control data, necessary for the call maintenance, e.g., signaling information, power control information, and other types of information known to one skilled in the art. However, the limited capacity of the forward link shared channel may prevent modulation by both the call information and the call maintenance information. Consequently, in another embodiment, only the user information is transmitted on the forward link shared channel 106, and the call maintenance information may be modulated on an additional forward link channel. In that case, each subscriber station 102 must monitor, in addition to the forward link shared channel, the additional forward link channels, comprising the call maintenance information. Such an additional channel may be a dedicated channel or a common channel, as described in the above-mentioned provisional application Ser. No. 60/279,970, entitled "METHOD AND APPARATUS FOR GROUP CALLS USING DEDICATED AND COMMON CHANNELS IN WIRELESS NETWORKS," filed Mar. 28, 2001, assigned to the assignee of the present invention are equally applicable.

In one embodiment, passive subscriber stations 102(2), 102(3), and 102(4) do not establish reverse links to any of the base stations 104. Note that if subscriber stations 102(2), 102(3), and 102(4) are completely passive, the individual base stations may be unaware of whether the subscriber stations are in their corresponding coverage areas. Even if a subscriber station registers with the base station when it enters the coverage area of a base station, the base station has no way of knowing when the subscriber station has left the base station coverage area.

Even if subscriber stations 102(2), 102(3), and 102(4) are passive, they still may use reverse link channel to communicate with the base stations. In the preferred embodiment, passive subscriber stations 102(2), 102(3), and 102(4) use the access channel to signal the base station if they are in need of more power from the forward link broadcast channel. Such a use of a reverse link channel is described in the above-mentioned provisional application Ser. No. 60/279,970, entitled "METHOD AND APPARATUS FOR GROUP CALLS USING DEDICATED AND COMMON CHANNELS IN WIRELESS NETWORK," filed Mar. 28, 2001, assigned to the assignee of the present invention are equally applicable.

It is well known in the art that base stations may be sectorized into two or more sectors. Consequently, where the term base station is used herein, it is implied that the term may refer to an entire base station or to a single sector of a multisectored base station. Furthermore, although in the description above, the common information was provided by the subscriber station 102(1), one of ordinary skills in the art understands that the concepts disclosed are equally applicable for the common information being provided by a source connected to the communication system 100 via the interface unit 110.

A standard cellular system is comprised of a plurality of base stations each of which provides communication for subscriber stations located within a limited coverage area. Together the plurality of base stations provides coverage to an entire service area. However, if the forward link shared channel is transmitted from every base station in the system at all times, the cost of the system can be quite high. A more efficient and economical manner which provides higher overall capacity for the system is to transmit the forward link shared channel only from those base stations in whose coverage areas is a subscriber station participating in a point-to-multipoint service located. Consequently, the corresponding resources are available for other point-to-point or point-to-multipoint services. In addition, the other users in the coverage area of the base stations which are not transmitting the forward link shared channel are not subject to interference therefrom.

As the description of the point-to-multipoint communication system indicates, to maximize capacity, the power control of the forward link broadcast channel is required. Furthermore, a power control of any dedicated forward link or reverse link channels is required.

Reverse Link Power Control

Reverse link power control is the method of controlling power of channels comprising the reverse link. In reverse link power control, the base station measures the quality metric of the signal received from the subscriber station transmitting on a reverse link channel, compares the measured quality metric against a threshold (a set point) and requests that the active subscriber station increases or decreases transmitted power level in accordance with a result of the comparison. The term active subscriber station (talker) is used herein to mean a subscriber station transmitting user data on a reverse traffic channel. As discussed above, in a group call, only one or few subscriber stations belonging to a group transmit user data on a reverse link at one time. Consequently, no member passive subscriber station (listener) has an established reverse link traffic channel to any of the base stations. The term passive is used herein to mean a subscriber station monitoring a forward link shared channel and any additional forward link channel if the additional forward link channel is transmitted, and not transmitting any user data on the reverse link. Of course, the passive subscriber stations may transmit non-user data, i.e., control and feedback data on an appropriate channel of the reverse link. The additional forward link channel may comprise a dedicated channel over which the subscriber station receives e.g., signaling information, power control information, overhead information and other types of information known to one skilled in the art. The assignment of channels for the forward link shared channel and the optional additional forward link channel(s) is communication system dependent. Thus, for example, in a communication system in accordance with the IS-2000 standard, examples of forward channel assignments are listed in Table 1.

TABLE 1

| Group | Forward Link | | Reverse link |
|---|---|---|---|
| | Common | Dedicated | |
| I | F-SCH | F-DCCH or F-FCH | R-DCCH or R-FCH |
| | F-BCCH | F-DCCH or F-FCH | R-DCCH or R-FCH |
| | F-CCCH | F-DCCH or F-FCH | R-DCCH or R-FCH |
| II | F-SCH | None | No reverse link transmission by listeners[1] |
| | F-BCCH | None | No reverse link transmission by listeners[1] |
| | F-CCCH | None | No reverse link transmission by listeners[1] |
| III | F-SCH | F-CPCCH for talker | No reverse link transmission by listeners[1] |

TABLE 1-continued

| Group | Forward Link Common | Forward Link Dedicated | Reverse link |
|---|---|---|---|
| | | F-CPCCH for all | R-DCCH or R-FCH or combination[2] |
| | F-BCCH | F-CPCCH for talker | No reverse link transmission by listeners[1] |
| | | F-CPCCH for all | R-DCCH or R-FCH or combination[2] |
| | F-CCCH | F-CPCCH for talker | No reverse link transmission by listeners[1] |
| | | F-CPCCH for all | R-DCCH or R-FCH or combination[2] |

Notes:
[1]Necessary system data are transmitted by the listeners using the reverse access channel (R-ACH), reverse enhanced access channel (R-EACH), or reverse common control channel (R-CCCH).
[2]For example talker utilizes the R-FCH, the listeners utilize R-DCCH.
Abbreviations:
F-SCH    Forward Supplemental Channel
F-BCCH   Forward Broadcast Channel
F-CCCH   Forward Common Control Channel
F-DCCH   Forward Dedicated Control Channel
F-FCH    Forward Fundamental Channel
F-CPCCH  Forward Common Power Control Channel
R-DCCH   Reverse Dedicated Control Channel
R-FCH    Reverse Fundamental Channel One skilled in the art recognizes, that channel assignment given in Table 1 both for the forward channels and the reverse channels is for tutorial purpose only. Consequently, additional combinations of the forward link shared channel and the optional additional forward link channel exist as disclosed in a co-pending application Ser. No. XX/XXX,XXX, entitled "METHOD AND APPARATUS FOR CHANNEL MANAGEMENT FOR POINT-TO-MULTIPOINT SERVICES IN A COMMUNICATION SYSTEM," filed Mar. 28, 2002, assigned to the assignee of the present invention. Furthermore, one of ordinary skills in the art killed in the art will be able to adapt the ideas of the invention disclosed in the presented embodiments to communication systems in accordance with other standards.

In a channel assignment method utilizing both forward link shared channel and the individually assigned dedicated forward link channels i.e., Group I of Table 1, all the sectors whose coverage area contain subscriber stations participating in the group call utilize a power control sub-channel, e.g., an F-PCSCH, which is punctured at a pre-determined rate, e.g., 800 bits-per second (bps) onto each of the individually assigned dedicated forward link channel, e.g., F-DCCH or F-FCH for the subscriber stations that transmit on a reverse link.

In a channel assignment method utilizing only the common forward link traffic channel, i.e., Group II of Table 1, in one embodiment, the sectors whose coverage area contains only listeners participating in the call do not transmit any reverse power control signals. The sector(s) whose coverage area contain(s) the active subscriber station(s) utilizes a sub-channel, e.g., a forward power control sub-channel (F-PCSCH), which is punctured at a pre-determined rate, e.g., 800 bits-per second (bps) onto the common forward link traffic channel, for reverse link power control. In an alternative embodiment, the power control information is not punctured into the common forward link traffic channel as a F-PCSCH, but the power control information is transmitted as a sub-stream of a Common Power Control Channel (F-CPCCH), i.e., the power control information is inserted into a pre-defined position into the common forward link power control channel. The active subscriber station(s) process the received F-PCSCH or the sub-stream of the F-CPCCH and adjust the transmission power accordingly. The passive subscriber stations in the sectors transmitting the sub-channel ignore the F-PCSCH or the F-CPCCH information. A control unit located at the individual sector, at a base station comprising the sector, at the controller, or any other element comprising the access network, determines whether a coverage area of a sector contains active subscriber station.

In a channel assignment method utilizing a forward link shared channel and the subscriber stations transmitting on a reverse link, e.g., Group III of Table 1, in one embodiment, the sectors whose coverage area contains only listeners participating in the call do not transmit any reverse power control signals. The sector(s) whose coverage area contain(s) the active subscriber station(s) utilizes a dedicated power control sub-channel, e.g., the F-PcSCH, to each of the subscriber stations transmitting on a reverse link.

Forward Link Power Control

Forward link power control is the method of controlling power of the channels comprising the forward link. In a forward link shared channel, each group call member subscriber station measures a quality metric of the received common forward link traffic channel, and transmits a feedback information to the sector(s) transmitting the common forward link traffic channel for the member subscriber station. In one embodiment, the quality metric comprises a signal-to-noise ratio expressed in terms of energy per bit over interference ($E_b/N_t$). However, one of ordinary skills in the art understands that other quality metrics, e.g., bit-error-rate, frame-error-rate, and other quality metrics known in the art may be used. The feedback is transmitted on a reverse link established between the member subscriber station and the sector. Each sector receives the feedback from those member subscriber stations in the sector's coverage area that transmit on reverse link and adjusts the transmit level to ensure that the desired quality of service (QoS) is delivered to all the member subscriber stations. A control unit located at the individual sector, at a base station comprising the sector, at the controller, or any other element comprising the access network, determines the transmit level.

As discussed above, the forward link condition for each subscriber station is different. Therefore, the sector is likely to receive conflicting forward link quality measurements form each subscriber station. The sector must then process the conflicting forward link quality measurements and make a power adjustment of the forward link shared channel. The sector adjusts the forward link shared channel to satisfy the power requirement of the subscriber station, which reports the worst forward link quality metric.

In the above-described embodiment, all member subscriber stations report the quality metric upon updating the quality metric measurement. To decrease the reverse link signaling load and increase battery life of a subscriber station, in another embodiment, the subscriber stations report the measured quality metric back to the base station only if the measured quality metric is not satisfactory. Thus, each member subscriber station measures the quality metric and compares the measured quality metric to a threshold. If the quality metric is better than the threshold, the subscriber station abstains from reporting the quality metric. Consequently, only the subscriber stations with a measured quality metric below the threshold report the quality metric. The base station then adjusts the common forward link traffic channel power to satisfy the power requirement of the subscriber station, which reports the worst forward link quality metric.

When the subscriber station determines the forward link channel quality metric, the subscriber station needs to feed back the forward link channel quality metric to the base station on a reverse link. As discussed above, only active subscriber station(s) transmit a reverse link traffic channel, which may be used for the feedback. Consequently, passive subscriber stations do not have an established reverse link traffic channel to any of the base stations. However, the passive remote stations may need to use a reverse link to communicate with base stations information necessary for call maintenance, e.g., handoff messages, power control, and other information known to one of ordinary skills in the art. Furthermore, passive subscriber stations may desire to communicate; therefore, the passive subscriber stations need to use a reverse link for requesting a reverse traffic channel assignment.

The different exemplary embodiments of reverse link channel assignment in a communication system in accordance with the IS-2000 standard are listed in Table 1, and will be discussed in that context. Furthermore, one of ordinary skills in the art will be able to adapt the ideas of the invention disclosed in the presented embodiments to communication systems in accordance with other standards.

In accordance with one embodiment, each passive subscriber station is assigned a reverse link dedicated channel, e.g., Dedicated Control Channel (R-DCCH), upon joining an active group. (E.g., Group I, Group III of Table 1). The subscriber station uses the R-DCCH for signaling both for regular calls, (e.g., reporting of forward link pilots) and signaling related to the group call (e.g., quality metric reporting of forward link broadcast channel, request for a reverse link traffic channel assignment.) When transmitting the R-DCCH, the member subscriber station also transmits a Reverse Pilot Channel (R-PCH) and a Reverse Power Control Sub-channel (R-PCSCH). The R-PCSCH carries feedback on a quality metric of the common broadcast forward link channel.

Figure 2:
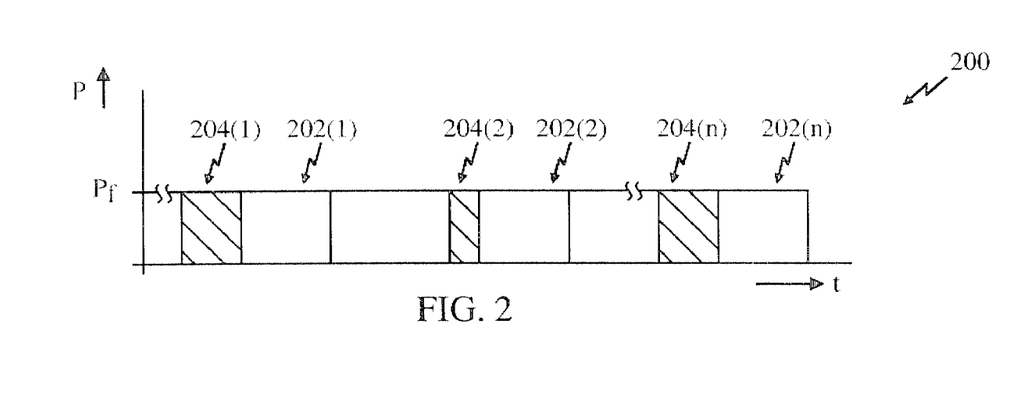
FIG. 2 illustrates a conceptual diagram of a forward link channel with fixed rate of data.

In one embodiment, the data rate on the forward link shared channel is fixed; the sector uses full rate (800 bps in accordance with the IS-2000 standard and 1600 bps in accordance with W_CDMA standard) forward power control. The forward link 200 for a fixed rate as illustrated in FIG. 2 is defined in terms of frames 202. A frame is a structure comprising a determined time span. Because the data rate is fixed, each frame 202 is transmitted with the same power $P_f$. Therefore, the current power control method is able to measure the quality metric of the Forward Link Shared Channel. A Forward Link Shared Channel quality metric may comprise, e.g., a signal to interference and noise ratio (SINR) expressed, for example, as energy per bit over noise (Eb/Nt). A required target decoder metric performance of the member subscriber station determines a Forward Link Shared Channel quality metric required for that subscriber station. Such a decoder metric may be e.g., a decoded frame error rate (FER), bit error rate (BER), and/or other decoder metric known to one skilled in the art. The member subscriber station measures the Forward Link Shared Channel quality metric, compares the quality metric against a fixed or adaptive threshold, and sends power control commands in accordance with the comparison results. In one embodiment, the power control commands 204 comprise a stream of up or down commands (similar to FPC_MODE='000' in accordance with IS-2000 standard).

The quality metric measurement and comparison can be carried out reliably by the subscriber station because, as discussed, the data rates on the Forward Link Shared Channel are fixed, therefore, do not change without notice to the member subscriber station. In an exemplary embodiment of an adaptive threshold adjustment, the threshold is increased by a first step, e.g., 0.5 dB, when a data frame of the Forward Link Shared Channel is received correctly. This threshold is decreased by a smaller step, e.g., $0.5 \text{ dB}/(1/\text{FER}_{desired}-1)$, when data frame on the Forward Link Shared Channel is received incorrectly. The $\text{FER}_{desired}$ represents the desired frame erasure rate for the Forward Link Shared Channel.

In another embodiment, utilizing the Forward Link Shared Channel and the individually assigned dedicated forward traffic channels, the quality metric of the Forward Link Shared Channel can be determined form the highest quality metric of the individually assigned dedicated forward traffic channel used by the member subscriber station. Because the rates transmitted on the Forward Link Shared Channel and the individually assigned dedicated forward traffic channels are different, a proper rate translation between the Forward Link Shared Channel and the individually assigned dedicated forward traffic channels must be made. The Forward Link Shared Channel quality metric is determined by scaling the quality metric of the individually assigned dedicated forward traffic channel in accordance with the rate translation.

The sector receives the power control commands transmitted on the reverse link dedicated channel and, in accordance with one embodiment, decreases a power transmit level of the Forward Link Shared Channel by an amount, e.g., 0.5 dB, when the feedback from all member subscriber station requests decrease of power. The sector increases the power transmit level by the same amount when at least one member subscriber station requests increase of power.

In another embodiment, the feedback is in a form of messages on R-DCCH.

In another embodiment, the sectors use a split feedback on the Forward Link Shared Channel and the individually assigned dedicated forward traffic channels if the dedicated forward traffic channels are assigned. The split feedback divides the reverse link stream power control commands into two sub-streams. As discussed, the power control stream in accordance with the IS-2000 comprises a stream of 800 bps. Thus, the first sub-stream can comprise, e.g., power control commands send at 400 bps, the second sub-stream then comprises, power control commands send at 400 bps The sub-streams may be formed, e.g., by assigning the odd-numbered feedback bits to the first sub-stream and the even-numbered feedback bits to the second sub-stream. The first sub-stream carries the power control commands for the Forward Link Shared Channel, the second sub-stream carries the power control commands for the dedicated forward traffic channels. In accordance with this method, the feedback stream power control commands for the Forward Link Shared Channel from each member subscriber station in the same sector can be in the form of a sequence of up and down commands (similar to FPC_MODE='001' or '010' in accordance to IS-2000 standard) or a stream of Erasure Indicator Bits (EIB) (similar to FPC_MODE='110' in accordance to IS-2000 standard). From this set of feedback for the Forward Link Shared Channel, the sector can set the transmit level for that Forward Link Shared Channel to meet the quality requirement and conserve power consumption. The EIB feedback also gives the base station a fast feedback on the member subscriber station reception of the Forward Link Shared Channel. This specific feedback facilitates the physical layer to start the re-transmission earlier than the NAK (negative acknowledge) from higher layers, if such re-transmission is desired and feasible. The feedback on the dedicated channels is processed in accordance with any method applicable to point-to-point power control method.

The sector receives the power control bits and, in accordance with one embodiment, increases a power transmit level of the broadcast forward traffic channel by a first amount, e.g., 0.5 dB, when the feedback from at least one member subscriber station requests increase of power or indicates an erasure. The sector decreases the power transmit level by a second amount when each member subscriber station requests decrease of power or indicates no erasure.

Figure 3:
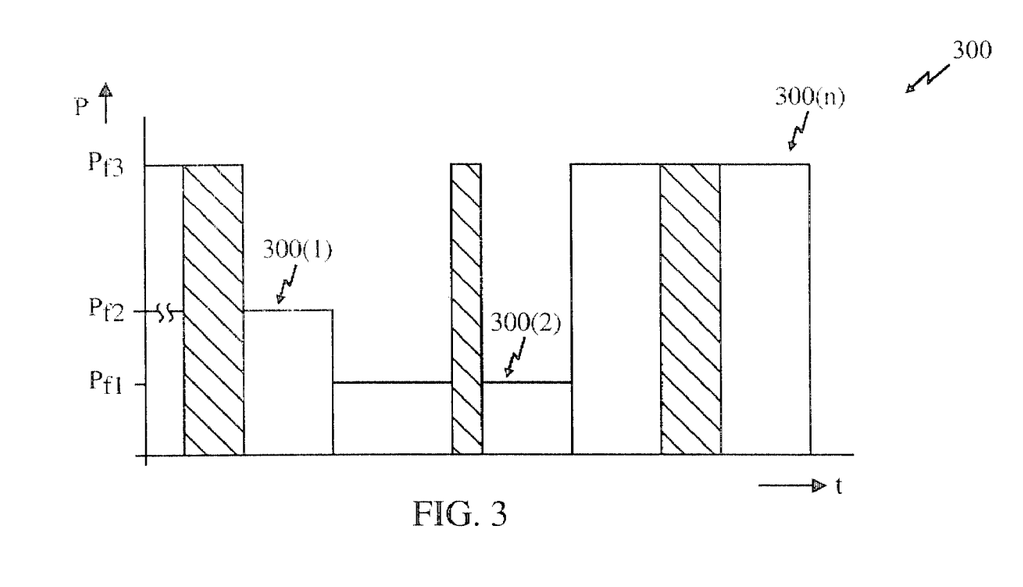
FIG. 3 illustrates a conceptual diagram of a forward link channel with variable rate of data.

In another embodiment, the data rate on the forward link shared channel is transmitted with a variable data rate, as illustrated in FIG. 3. Because the data rate is variable, each frame 300 is transmitted with a power P corresponding to the data rate transmitted in that frame. Thus, e.g., frame 300(n) a full-rate frame, is transmitted with a power $P_{f3}$, a half-rate frame 300(1) is transmitted with a power $P_{f2}$, and an eighth-rate frame 300(2) is transmitted with a power $P_{f1}$. To enable the subscriber station power control to correctly estimate the forward link shared channel quality metric, the feedback power control commands for reverse link power control utilize a sub-channel, e.g., a forward power control sub-channel (F-PCSCH), which is punctured at a pre-determined rate, e.g., 800 (bps) onto the common forward link traffic channel with a constant power. In an alternative embodiment, the power control information is not punctured into the common forward link traffic channel as a F-PCSCH, but the power control information is transmitted as a sub-stream of a Forward Common Power Control Channel (F-CPCCH), i.e., the power control information is inserted into a pre-defined position into the common forward link common power control channel. The power control bits for reverse link power control can be used to measure the Forward Link Shard Channel quality metric.

In one embodiment, the feedback power control commands for forward link power control may be sent as messages on the individually assigned R-DCCH.

In one embodiment, the feedback power control commands for forward link power control may be sent as an EIB on a R-PCSCH. In one embodiment, the power control bits corresponding to a frame are grouped to form a single EIB. In another embodiment, some bits in a frame are grouped to form an EIB while the remaining bits convey detailed amount of SINR deficit or surplus detected by the member MS. In one embodiment, if no dedicated channels are assigned individually, all the power control commands sent on the R-PCSCH are utilized to control the Forward Link Shared Channel.

Alternatively, the passive member subscriber station are not assigned R-DCCH. (E.g., Group II, Group III of Table 1.) The passive member subscriber stations use access channels, e.g., R-ACH, R-EACH, or control channels, e.g., R-CCCH, or to send any information to the base station.

Consequently, in accordance to one embodiment, instead of providing a power control feedback in a form of continuous stream of power commands, the power control feedback is provided in a form of messages modulated on the R-ACH, R-EACH, or the R-CCCH. This alternative is attractive in that the member subscriber stations does not continually update the quality metrics of a forward link shared channel, but send a feedback message only when the updated quality metrics falls below a certain threshold. In one embodiment, the message is sent when a frame error rate (FER) averaged over the most recent 50 frames is 4% or higher. However, one of ordinary skills in the art recognizes that, in an alternative embodiment, the message may be generated every time the quality metrics is updated. Within the message, several fields or quality indications may be included. For example, there may be a field indicating the strength at which the subscriber station perceives the pilot signal from the base station. Alternatively, there may be a field indicating the strength or quality at which the subscriber station perceives the forward link broadcast channel. There may be a field indicating the signal strength or quality of both the pilot channel and the forward link broadcast channel. There may be a field which indicates the difference between or the ratio of the pilot signal strength to the forward link broadcast channel strength; the quality of the group call channels, the desired increase in received signal to noise and interference ratio, and other related information known to one skilled in the art.

The base station periodically decreases the forward link shared channel transmit power level by a first amount if the sector does not receive a feedback message from a member subscriber station requesting power increase. The base station increases the forward link shared channel transmit power level by a second amount when messages requesting power increase are received from one or more member subscriber station.

The message based power control is slower than the bit stream power control. Consequently, should a member subscriber station require faster power control, e.g., due to worsening of condition of the link, and, consequently, of the received signal, the member subscriber station can use a message conveyed on the R-ACH, R-EACH, or control channels, e.g., R-CCCH, to request assignment of a reverse pilot channel R-PCH and R-PCSCH. Alternatively, the base station may determine that a particular member subscriber station consistently requires transmit power level adjustment. The base station then assigns the particular member subscriber station the R-PCH and R-PCSCH. Furthermore, the R-PCH/R-PCSCH can be gated. The term gating as used herein means activating transmission of the R-PCH/R-PCSCH only in pre-determined power control groups (PCG). If the condition of the link further worsen, the subscriber station may request, or be assigned, an R-DCCH, a R-FCH or combination.

If there are no individually assigned F-DCCHs, (e.g., Group II or Group III of Table 1) all bits carried on the R-PCSCH are used for the power control of the forward link shared channel. In one embodiment, the PC bits corresponding to a frame are grouped to send a single EIB. In another embodiment, some bits in a frame's time are grouped to send an EIB while the others convey detailed amount of S/(N+I) deficit or surplus detected by the member MS.

Dedicated Forward Link Channel

As discussed in the co-pending application Ser. No. XX/XXX,XXX, entitled "METHOD AND APPARATUS FOR MANAGEMENT FOR POINT-TO-MULTIPOINT SERVICES IN A COMMUNICATION SYSTEM," filed Mar. 28, 2002, the forward link shared channel is modulated by traffic information, signaling messages necessary to maintain the call, (e.g., a pilot strength measurement message, handoff direction message, handoff completion message, and other messages known to one of ordinary skills in the art), and messages related to the group-call, (e.g., a start and an end of a call, request and grant of a right to transmit, and other messages known to one of ordinary skills in the art.) Because the F-SCH(s) is a common channel, proper subscriber station addressing information must be employed, so that the subscriber station can discern common information from information directed to the subscriber station. Because the signaling messages and the overhead of subscriber station addressing negatively affects the traffic capacity, alternatively, the forward link shared channel is modulated only by the traffic information and the signaling messages are carried on an additional forward link channel. The additional forward link channel is a dedicated channel assigns to each individual member subscriber station.

Because the dedicated forward link channels are assigned individually to each member subscriber station, the transmit power level of the dedicated channels can be controlled by methods applicable to point-to-point communication. Thus, the subscriber station determines quality metric of the dedicated forward link channel, reports it back to a base station and the base station adjusts the power level of the dedicated forward link channel.

The base station may utilize the determined transmit power level of the dedicated forward link channel to determine a transmit power level of the forward link shared channel by proper rate translation of information transmitted on the forward link shared channel and the dedicated forward link channel for each member subscriber station. The base station then adjusts the a transmit power level of the forward link shared channel to satisfy the subscriber station with the highest power requirement.

Because the dedicated forward link channel is modulated by signaling and overhead information, there may be insufficient activity on the forward link channel to assure sufficient accuracy of determination of transmit power level of the dedicated forward link channel via the rate translation. Consequently, the base station monitors the activity on both the forward link shared channel and the dedicated forward link channel, and sends 'keep-alive' frames on the dedicated forward link channel to ensure sufficient activity for accuracy of the rate translation.

Those of ordinary skill in the art will recognize that although the various embodiments were described in terms of flowcharts and methods, such was done for pedagogical purposes only. The methods can be performed by an apparatus, which in one embodiment comprises a processor interfaced with a transmitter, a receiver and any other appropriate blocks of the AT and/or AP.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for power control for point-to-multipoint services in a communication system, comprising:
   receiving at a subscriber station belonging to a group a forward link shared channel;
   adjusting at an active subscriber station belonging to the group reverse link transmission power in accordance with the reverse link power control commands contained in the forward link shared channel while the active subscriber station remains active in point-to-multipoint services and forgoing monitoring for the reverse link power control commands when the active subscriber station becomes a passive subscriber station continuing to receive on the forward link shared channel and the power control commands are no longer transmitted in the forward link shared channel.

2. The method as claimed in claim 1, further comprising:
   ignoring at a passive subscriber station belonging to the group the reverse link power control commands contained in the forward link shared channel.

3. A method for power control for point-to-multipoint services in a communication system, comprising:
   receiving at a subscriber station belonging to a group a forward link shared channel;

receiving at the subscriber station a forward link dedicated channel;
monitoring the forward link dedicated channel for reverse link power control commands; and
adjusting at an active subscriber station belonging to the group reverse link transmission power in accordance with the reverse link power control commands contained in the forward link dedicated channel while the active subscriber station remains active in point-to-multipoint services and forgoing monitoring for the reverse link power control commands when the active subscriber station becomes a passive subscriber station continuing to receive on the forward link shared channel and the power control commands are no longer transmitted in the forward link dedicated channel.

4. A method for power control for point-to-multipoint services in a communication system, comprising:
receiving at a subscriber station belonging to a group a forward link shared channel;
receiving at each active subscriber station belonging to a group a forward link dedicated channel;
monitoring the forward link dedicated channel for reverse link power control commands; and
adjusting at the active subscriber station reverse link transmission power in accordance with the reverse link power control commands contained in the forward link dedicated channel while the active subscriber station remains active in point-to-multipoint services and forgoing monitoring for the reverse link power control commands when the active subscriber station becomes a passive subscriber station continuing to receive on the forward link shared channel and the power control commands are no longer transmitted in the forward link dedicated channel.

5. An apparatus for power control for point-to-multipoint services in a communication system, comprising:
means for receiving at a subscriber station belonging to a group a forward link shared channel;
means for adjusting at an active subscriber station belonging to the group reverse link transmission power in accordance with the reverse link power control commands contained in the forward link shared channel while the active subscriber station remains active in point-to-multipoint services and forgoing monitoring for the reverse link power control commands when the active subscriber station becomes a passive subscriber station continuing to receive on the forward link shared channel and the power control commands are no longer transmitted in the forward link shared channel.

6. The apparatus as claimed in claim 5, further comprising:
means for ignoring at a passive subscriber station belonging to the group the reverse link power control commands contained in the forward link shared channel.

7. An apparatus for power control for point-to-multipoint services in a communication system, comprising:
means for receiving at a subscriber station belonging to a group a forward link shared channel;
means for receiving at the subscriber station a forward link dedicated channel;
means for monitoring the forward link dedicated channel for reverse link power control commands; and
means for adjusting at an active subscriber station belonging to the group reverse link transmission power in accordance with the reverse link power control commands contained in the forward link dedicated channel while the active subscriber station remains active in point-to-multipoint services and forgoing monitoring for the reverse link power control commands when the active subscriber station becomes a passive subscriber station continuing to receive on the forward link shared channel and the power control commands are no longer transmitted in the forward link dedicated channel.

8. An apparatus for power control for point-to-multipoint services in a communication system, comprising:
means for determining sectors in point-to-multipoint service whose coverage area contain an active subscriber station and passive subscriber stations belonging to a group; and
means for transmitting reverse link power control commands on a forward link dedicated channel from the determined sectors including the active subscriber station while the active subscriber station remains active and forgoing transmission of the reverse power link control commands in determined sectors not including the active subscriber station and forgoing transmitting the reverse link power control commands when the active subscriber station becomes a passive subscriber station continuing to receive on the forward link shared channel and the power control commands are no longer transmitted in the forward link dedicated channel.

9. The apparatus as claimed in claim 8, wherein said means for transmitting reverse link power control commands on a forward link dedicated channel from the determined sectors comprises:
means for puncturing the reverse link power control commands into the forward link dedicated channel.

10. The apparatus as claimed in claim 8, wherein said means for transmitting reverse link power control commands on a forward link dedicated channel from the determined sectors comprises:
means for inserting the reverse link power control commands into the forward link dedicated channel.

11. An apparatus for power control for point-to-multipoint services in a communication system, comprising:
means for receiving at a subscriber station belonging to a group a forward link shared channel;
means for receiving at each active subscriber station belonging to a group a forward link dedicated channel; and
means for adjusting at the active subscriber station reverse link transmission power in accordance with reverse link power control commands contained in the forward link dedicated channel while the active subscriber station remains active in point-to-multipoint services and forgoing monitoring for the reverse link power control commands when the active subscriber station becomes a passive subscriber station continuing to receive on the forward link shared channel and the power control commands are no longer transmitted in the forward link dedicated channel.

12. An apparatus for power control for point-to-multipoint services in a communication system, comprising:
a subscriber station configured to:
receive a forward link shared channel; and
adjust reverse link transmission power in accordance with the reverse link power control commands contained in the forward link shared channel while the subscriber station remains active in point-to-multipoint services and forgoing monitoring for the reverse link power control commands when the active subscriber station becomes a passive subscriber station continuing to receive on the forward link shared channel and the power control commands are no longer transmitted in the forward link shared channel.

13. The apparatus as claimed in claim 12, wherein said subscriber station is further configured to ignore the reverse link power control commands contained in the forward link shared channel if said subscriber station does not transmit on a reverse link.

14. An apparatus for power control for point-to-multipoint services in a communication system, comprising:
a subscriber station configured to:
receive a forward link shared channel;
receive a forward link dedicated channel;
monitor the forward link dedicated channel for reverse link power control commands; and
adjust reverse link transmission power in accordance with the reverse link power control commands contained in the forward link dedicated channel while the subscriber station remains active in point-to-multipoint services and forgo to monitor for the reverse link power control commands when the active subscriber station becomes a passive subscriber station continuing to receive on the forward link shared channel and the power control commands are no longer transmitted in the forward link dedicated channel.

15. A computer-readable storage medium including computer-executable instructions encoded thereon for:
receiving at a subscriber station belonging to a group a forward link shared channel;
adjusting at an active subscriber station belonging to the group reverse link transmission power in accordance with the reverse link power control commands contained in the forward link shared channel while the active subscriber station remains active in point-to-multipoint services and forgoing monitoring for the reverse link power control commands when the active subscriber station becomes a passive subscriber station continuing to receive on the forward link shared channel and the power control commands are no longer transmitted in the forward link shared channel.

16. The computer-readable storage medium as in claim 15 further comprising computer-executable instructions encoded thereon for:
ignoring at a passive subscriber station belonging to the group the reverse link power control commands contained in the forward link shared channel.

* * * * *